2,968,646
POLYFORMALS OF CYCLIC DIOLS

John R. Caldwell and Winston J. Jackson, Jr., Kingsport, Tenn., assignors to Eastman Kodak Company, Rochester, N.Y., a corporation of New Jersey No Drawing. Filed Sept. 30, 1958, Ser. No. 764,240

11 Claims. (Cl. 260—67)

This invention concerns a new class of normally solid linear polyformals and the preparation thereof.

Polyformals were first prepared by Hill and Carothers, J. Am. Chem. Soc., 57, 925 (1935), from various straight-chain diols. However, these polymers were relatively unstable to hydrolysis as well as having relatively low melting points. Hence, the linear polyformals described in the literature were of limited utility for use in films, sheets, fibers and molded objects.

It is an object of this invention to provide a new class of linear polyformals.

It is another object of this invention to provide a new class of linear polyformals that are particularly resistant to hydrolysis.

It is another object of this invention to provide novel linear polyformals having high melting points which lend to their utility as commercial resin compositions.

It is also an object of this invention to provide a new class of film-forming and fiber-forming linear polyformals.

It is likewise an object of this invention to prepare by a novel process a more highly condensed linear polyformal.

These and other objects of the invention are attained as described in detail hereinafter.

The novel linear polyformals of the invention are prepared from cyclic diols as distinguished from the non-cyclic diols of the prior art. The polyformals of the invention have the recurring structural unit $$-(CH_2-O-Q-O)-$$

wherein Q is a divalent hydrocarbon radical derived from a dihydroxy alcohol having a cyclic nucleus.

The cyclic diols employed to prepare the present linear polyformals have cyclic nuclei containing 4 to 7 carbon atoms including such cyclic nuclei as cyclobutane, cyclopentane, cyclohexane, norcamphane and the like. Typical diols used in preparing the present polyformals are 1,4-cyclohexanedimethanol, 1,2-cyclohexanedimethanol, trans-quinitol, 2,3-norcamphanedimethanol, 2,5-norcamphanedimethanol, 2,6 - norcamphanedimethanol, 2,5-norcamphanediol, 2,6 - norcamphanediol, 1,2 - cyclopentanedimethanol, 1,4 - cyclobutanediol, 2,2,4,4-tetramethyl-1,3-cyclobutanediol, and related cyclic hydrocarbon diols. Likewise, mixtures of such cyclic diols can be employed in preparing the subject polyformals.

The cyclic diols used in preparing the present linear polyformals can be reacted with a dialkyl formal in the presence of a condensation catalyst. This reaction can be represented by the following equation:

HO—Q—OH+CH$_2$(OR)$_2$→
—(CH$_2$—O—Q—O)$_x$—+2ROH wherein R is an alkyl group and Q is a divalent cyclic hydrocarbon radical derived from a cyclic diol as described above, and is desirably one of such divalent cyclic saturated hydrocarbon radicals as those having the following structural formulas:

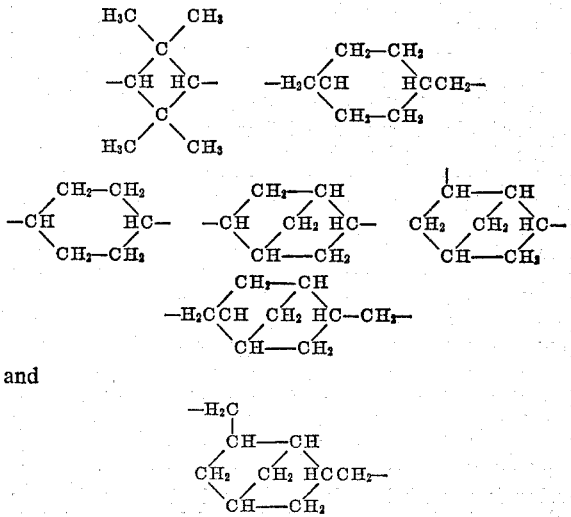

and

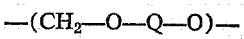

The dialkyl formal serves as a source of formaldehyde and can be dimethyl, diethyl, di-n-propyl, di-n-butyl, di-isobutyl as well as higher molecular weight dialkyl formals. Di-n-butyl formal and higher molecular weight formals usually having alkyl groups with up to about 10 carbon atoms are preferred since they boil high enough so that it is not necessary to carry out the reaction with the cyclic diol in a sealed reactor. It is advantageous to effect the reaction in the presence of an acidic-reacting condensation catalyst, such as sulfuric acid, hydrochloric acid, boronfluoride, p-toluene sulfonic acid, 10-camphorsulfonic acid, alkane sulfonic acids, methionic acid, ferric chloride and other acids of these general types. The amount of catalyst can be varied in accordance with usual practice, although amounts of at least about .01% and usually not more than about 1% by weight based on the reactants are employed.

In carrying out the reaction of the dialkyl formal and the cyclic diol, the alkyl alcohol by-product derived from the dialkyl formal is desirably removed from the reaction or polymerization mixture during the course of the reaction. Reaction times can be widely varied although the reaction is typically effected in about 3 to 10 hours. Reaction temperatures likewise can be widely varied although temperatures from about 50° C. to about 300° C. are more generally employed.

A preferred method for preparing the subject linear polyformals is to employ paraformaldehyde as the source of formaldehyde in lieu of the dialkyl formal described above. This reaction can be represented by the following equation:

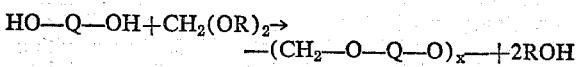

wherein Q is a divalent saturated cyclic hydrocarbon radical derived from a cyclic diol as described above. In such a process the water by-product of the reaction is preferably continuously removed from the reaction mixture. An inert solvent such as benzene, toluene, cyclohexane, xylene or the like is employed in the reaction. An acidic-reacting condensation catalyst as described above is also employed. This reaction is effected at an elevated temperature, usually at the reflux temperature of the reaction mixture. After the viscosity of the reaction mixture has substantially increased indicating substantial polymerization, the solvent is distilled off under reduced pressure and the molecular weight of the polyformal is built up by heating either in the melt or the solid phase under a reduced pressure of preferably less than about 100 mm. of mercury, or in the solid phase in an inert atmosphere such as in nitrogen at substantially atmospheric pressure, until the molecular weight of the polyformal has been substantially increased. Polymerization in the molten state can be effected at temperatures ranging from the melting point to the decomposition point of the particular polymer. In the solid phase polymerization, the polyformal is heated to a polymerization temperature below its melting point.

The linear polyformals prepared from the cyclic diols as described above are normally solid and are desirably prepared in average molecular weights of at least 10,000 and more usually between about 10,000 and 20,000. The resins of the invention are valuable for use in the manufacture of transparent films and sheets, fibers, and molding plastics. These polyformals are also of value as constituents in protective coatings of varying types. The subject polyformals are characterized as being particularly resistant to hydrolysis. An outstanding class of polyformals that has extreme resistance to hydrolysis as compared to other polyformals are the polyformals prepared from 2,2,4,4-tetraalkyl-1,3-cyclobutanediols wherein the alkyl substituent contains 1 to 4 carbon atoms, and preferably is a methyl radical. These latter named linear polyformals also are particularly useful because of their unusually high melting points. The polyformal prepared from 2,2,4,4-tetramethyl-1,3-cyclobutanediol can be prepared to have a melting point of about 265° C., for example.

The invention is illustrated by the following examples of preferred embodiments thereof.

EXAMPLE 1

A mixture of 14.4 g. of 2,2,4,4-tetramethyl-1,3-cyclobutanediol, 3.8 g. of paraformaldehyde, 20 ml. of benzene and 0.05 g. of 10-camphorsulfonic acid was stirred and simmered for one hour and then refluxed for two hours, the water formed during the reaction being collected in a Dean-Stark trap. Thereafter 0.3 g. of paraformaldehyde was added, the mixture simmered for ½ hour and then refluxed for ½ hour. The benzene solvent was removed under reduced pressure on a steam bath and the remaining residue was cooled to room temperature and ground to pass a 40 mesh screen. The resulting ground composition was further polymerized in the solid state by heating for 3 hours, starting at 150° C. and slowly raising the temperature to 250° C., and thereafter 3 more hours at 250° C., this solid phase polymerization being effected under a vacuum of 0.1 mm. of mercury. The resulting polyformal had an inherent viscosity of 0.91 and a melting point of 265° C. as determined under nitrogen. The polyformal was exceptionally stable to acid hydrolysis. A sample of the polyformal was ground to pass a 40 mesh screen, this ground polymer not dissolving in aqueous 10% hydrochloric acid after heating for 6 hours on a steam bath. The prepared polyformal is suitable for use in textile fibers, thin films, sheets and molded objects.

EXAMPLE 2

A mixture containing 11.6 g. of trans-quinitol, 3.3 g. of paraformaldehyde, 0.05 g. of p-toluene sulfonic acid, and 40 ml. of benzene was simmered just below the boiling point of the mixture with stirring for one hour. The resulting mixture was then refluxed for 2 hours and the water formed during the reaction collected in a Dean-Stark trap. Then 0.15 g. of paraformaldehyde was added and the mixture stirred and simmered for ½ hour before similarly refluxing again for 1 hour. Another 0.15 g. portion of paraformaldehyde was added and the reaction mixture again stirred and simmered for ½ hour and once again refluxed for 1 hour. The benzene solvent was removed from the reaction mixture under reduced pressure on a steam bath. The resulting residue was ground to pass a 40 mesh screen and then heated for 1½ hours, starting at 150° C. and slowly raising the temperature to 193° C., and then 2 hours at 193° C. under a vacuum of 0.1 mm. of mercury. The resulting polyformal melted at about 190–200° C., had an inherent viscosity of 0.53 and was stable to hydrolysis.

EXAMPLE 3

A polyformal was prepared from an isomeric mixture of 2,5-norcamphanediol and 2,6-norcamphanediol according to the procedure of Example 2 but using 20 ml. of benzene as the reaction solvent. After removal of the benzene solvent, the polymer was built up in the melt phase under a vacuum of 0.5 mm. of mercury while stirring at 200° C. for 2 hours. The resulting polyformal softened at 150–170° C. and had an inherent viscosity of 0.41. The polyformal was stable to hydrolysis. The norcamphanediol mixture employed in preparing the polyformal can be prepared from bicyclo(2,2,1)hept-5-ene-2-ol acetate. More specifically, a solution was made of 608 g. of bicyclo(2,2,1)hept-5-ene-2-ol acetate, 600 ml. of glacial acetic acid and 24 ml. of a mixture of 0.22 moles of acetic anhydride and 3 ml. of 60% perchloric acid. The resulting solution was refluxed for 1 hour. After cooling to room temperature, the resulting dark, oily liquid was washed twice with 1 liter of water, and then with 1 liter of sodium carbonate to give a neutral solution. Each of the washings was extracted with 100 ml. of benzene. The benzene extracts were combined with the washed mixture and refluxed for one hour. During the refluxing the water present was removed as a benzene azeotrope. The benzene was thereafter removed by distillation and the remaining oil fractionated to give a fraction boiling at 91–95° C. at 1 mm. of mercury. To a solution of 387.4 grams of the resulting mixture of 2,5-norcamphanediol diacetate and 2,6-norcamphanediol diacetate in 650 ml. of anhydrous methanol was added 19.4 g. of sodium methylate. This solution was refluxed for one hour and 21.5 g. of glacial acetic acid added to neutralize the sodium methylate. The excess methanol was then removed by vacuum distillation and the remaining residue recrystallized from 500 ml. of butyl acetate to yield a mixture of 2,5-norcamphanediol and 2,6-norcamphanediol melting at 175–179° C.

EXAMPLE 4

A polyformal was prepared from 0.1 mole of 1,4-cyclohexanedimethanol according to the procedure of Example 2 except that 0.05 g. of 10-camphorsulfonic acid was used as the catalyst and 20 ml. of benzene was used as the solvent. After removal of the benzene solvent under reduced pressure on a steam bath, a vacuum of 0.5 mm. of mercury was applied while the polymer was stirred at a temperature of 180° C. for two hours. The resulting polyformal had a softening range of 70–100° C. and an inherent viscosity of 0.43. The polyformal was stable to hydrolysis. The 1,4-cyclohexanedimethanol employed can be prepared by hydrogenating dimethyl 1,4-cyclohexanedicarboxylate in the presence of a chromite catalyst at a temperature of about 250° C. for about 1 hour.

EXAMPLE 5

A solution containing 8.0 g. of di-n-butyl formal, 7.5 g. of 1,4-cyclohexanedimethanol and 0.03 g. of ferric chloride was heated for 3 hours at 160–170° C. and then for 1½ hours at 200° C. During the reaction the resulting n-butanol was distilled from the reaction mixture. Thereafter, a vacuum of 0.5 mm. of mercury was applied and the mixture heated for 3 hours at 200° C. The resulting polyformal was dissolved in benzene and poured into ethanol and the precipitated polyformal separated therefrom. The polyformal softened at 70–100° C. and had an inherent viscosity of 0.38. A sample of the polyformal was not hydrolyzed when boiled in water for 24 hours.

EXAMPLE 6

A polyformal was prepared from 0.050 mole of 2,2,4,4-tetramethyl-1,3-cyclobutanediol and 0.052 mole of di-n-butyl formal by the method described in Example 5 except that the final polymerization temperature was 250° C. rather than 200° C. The resulting polymer had an inherent viscosity of 0.32 and softened at 200–230° C. under nitrogen. The prepared polyformal was stable to hydrolysis.

EXAMPLE 7

A polyformal was prepared from 10.4 g. of diethyl formal and 15.6 g. of a mixture of 2,5-norcamphanedimethanol and 2,6-norcamphanedimethanol by heating with 0.05 g. of ferric chloride for 4 hours at 200° C. in an enclosed, sealed reactor and then 3 hours longer at 200° C. under a vacuum of 0.5 mm. of mercury. The resulting product was dissolved in dioxane and then precipitated by pouring into ethanol. The polyformal softened at 100–140° C. and had an inherent viscosity of 0.34. A sample of the prepared polyformal was not hydrolyzed when boiled in water for 24 hours.

EXAMPLE 8

A polyformal was prepared from 10.4 g. of di-n-butyl formal, 11.6 g. of trans-quinitol and a tiny crystal of methionic acid by the procedure described in Example 5. The resulting polyformal softened at 185–195° C. and had an inherent viscosity of 0.35. A sample of the polyformal was not hydrolyzed when boiled in water for 24 hours.

EXAMPLE 9

A mixture containing 12.8 g. of 2,5-norcamphanediol and 2,6-norcamphanediol, 16.8 g. of di-n-butyl formal and a tiny crystal of methionic acid was heated at 180° C. for 2 hours and the n-butanol which formed was allowed to distill off. The resulting mixture was then heated for 1 hour at 200° C., a vacuum of 0.5 mm. of mercury applied and thereafter heated for 30 minutes at 200° C. and then for 30 more minutes at 220° C. The resulting polyformal softened at 150–170° C. and had an inherent viscosity of 0.47. A sample of the resulting polyformal was resistant to hydrolysis in boiling water for 24 hours.

EXAMPLE 10

A polyformal was prepared from 2,2,4,4-tetramethyl-1,3-cyclobutanediol and paraformaldehyde in accordance with the procedure of Example 1 except for the polymerization of the ground composition, which polymerization was carried out substantially at atmospheric pressure by heating the ground composition under a stream of nitrogen for 3 hours, starting at 150° C. and slowly raising the temperature to 250° C., and thereafter 3 more hours at 250° C. The resulting polyformal had an inherent viscosity of 0.47.

EXAMPLE 11

To illustrate the improved resistance to hydrolysis possessed by the polyformals of the invention which are prepared from cyclic diols, and in particular the improved resistance to hydrolysis of the polyformal prepared from 2,2,4,4-tetramethyl-1,3-cyclobutanediol, several polyformals prepared from aliphatic diols and from cyclic diols were subjected to a comparative hydrolysis test. Polyformals were prepared from 1,10-decanediol and from 1,6-hexanediol by the general method described in Example 3 except that these diols were used in lieu of the norcamphanediol, and compared with the polyformals of 2,2,4,4-tetramethyl-1,3-cyclobutanediol and 1,4-cyclohexanedimethanol prepared by the general methods described in Examples 1 and 4, respectively. The hydrolysis data was obtained by heating equal amounts of the polyformals in about 40 mesh particles with aqueous 10% hydrochloric acid on a steam bath. The polyformal samples had substantially the same inherent viscosities of about 0.4. The time required to degrade or breakdown the respective polyformal samples is indicated in the following table.

Table

| Diol Used to Prepare Polyformal | Degradation Time in Minutes |
|---|---|
| 1,6-hexanediol | 40 |
| 1,10-decanediol | 30–40 |
| 1,4-cyclohexanedimethanol [1] | 70 |
| 2,2,4,4-tetramethyl-1,3-cyclobutanediol [1] | 360 |

[1] Polyformals of the invention.

The degradation of the respective polyformals set out in the above table was determined when the polyformal dissolved in the aqueous 10% hydrochloric acid media. However, 1,10-decanediol is insoluble in hot water, and hence, methanolic 10% hydrochloric acid was employed in this instance.

The inherent viscosities referred to in the above examples were measured in 60%/40% phenol/tetrachloroethane.

The present invention thus provides a new and improved class of linear polyformals. These plastic compositions have particular utility because of their relatively high melting points and unusual resistance to hydrolysis. The polyformals prepared from 2,2,4,4-tetraalkyl-1,3-cyclobutanediols are particularly outstanding with respect to their high melting points and high resistance to hydrolysis. Accordingly, the present linear polyformals prepared from cyclic diols are considerably more useful than the linear polyformals prepared from non-cyclic diols.

Although the invention has been described in considerable detail with reference to certain preferred embodiments thereof, it will be understood that variations and modifications can be effected within the spirit and scope of the invention as described hereinabove and as defined in the appended claims.

We claim:

1. A normally solid linear polyformal having an average molecular weight of at least about 10,000 and consisting essentially of a recurring structural unit having a formula selected from the group consisting of

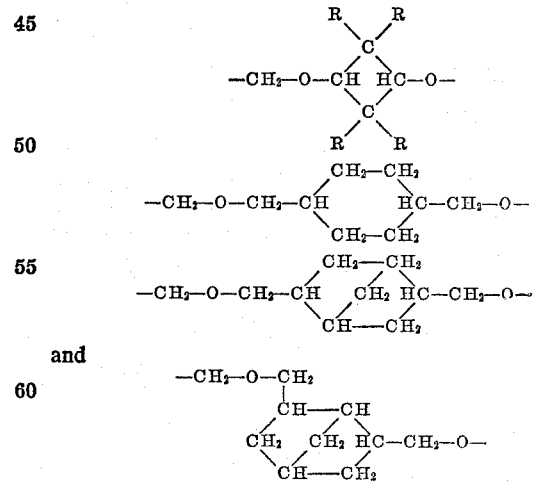

and

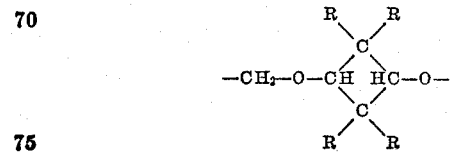

wherein R is an alkyl radical having 1 to 4 carbon atoms.

2. A normally solid linear polyformal having an average molecular weight of at least about 10,000 and consisting essentially of the recurring structural unit wherein R is a lower alkyl radical having 1 to 4 carbon atoms.

3. A normally solid linear polyformal having an average molecular weight of at least about 10,000 and consisting essentially of the recurring structural unit

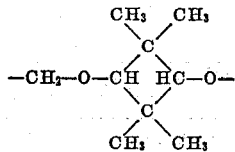

4. A normally solid linear polyformal having an average molecular weight of at least about 10,000 and consisting essentially of the recurring structural unit

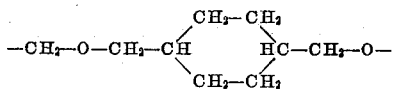

5. A normally solid linear polyformal having an average molecular weight of at least about 10,000 and consisting essentially of a mixture of the recurring structural units

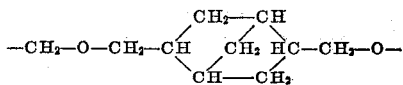

and

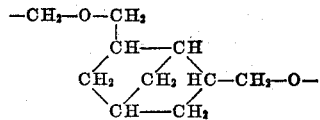

6. The process which comprises condensing formaldehyde and a diol of the formula HO—Q—OH wherein Q is a hydrocarbon radical having a formula selected from the group consisting of

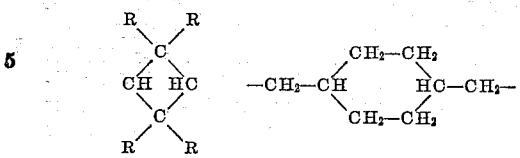

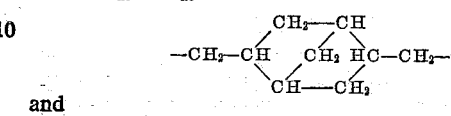

and

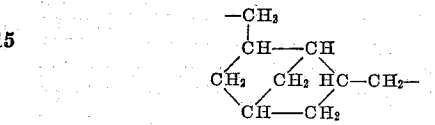

wherein R is an alkyl radical having 1 to 4 carbon atoms, in an inert organic solvent in admixture with an acidic-reacting condensation catalyst at a temperature in the range of 50° C. to 300° C. under conditions permitting the removal of water from the reaction mixture and forming a normally solid linear polyformal having an average molecular weight of at least about 10,000 consisting essentially of the recurring structural unit—$(CH_2-O-Q-O)$—.

7. The process according to claim 6 wherein the diol is a 2,2,4,4-tetraalkyl-1,3-cyclobutanediol having alkyl radicals containing 1 to 4 carbon atoms.

8. The process according to claim 6 wherein the diol is 2,2,4,4-tetramethyl-1,3-cyclobutanediol.

9. The process according to claim 6 wherein the diol is 1,4-cyclohexanedimethanol.

10. The process according to claim 6 wherein the diol is a mixture of 2,5-norcamphanedimethanol and 2,6-norcamphanedimethanol.

11. The process according to claim 6 wherein the acidic-reacting condensation catalyst is methionic acid.

References Cited in the file of this patent

UNITED STATES PATENTS 2,786,081    Kress _____ Mar. 19, 1957